United States Patent Office 3,594,389
Patented July 20, 1971

3,594,389
CERTAIN 4-(N-ALKENYLCARBAMYL) THIAZOLES
Robin D. G. Cooper, Indianapolis, Ind., assignor to Eli Lilly and Company, Indianapolis, Ind.
No Drawing. Filed June 12, 1969, Ser. No. 832,853
Int. Cl. C07d 91/30
U.S. Cl. 260—302R
4 Claims

ABSTRACT OF THE DISCLOSURE

Substituted thiazoles useful as antibiotics and antifungal agents or as anti-radiation chemicals, are obtained by treatment of a thiazoline azetidinone with an acid or a base to open the β-lactam ring. The thiazoline azetidinone is obtained by treatment of a penicillin sulfoxide with triphenyl phosphine or a trialkyl phosphite.

BACKGROUND OF THE INVENTION

The disclosure of Morin and Jackson, U.S. Patent 3,275,626 that penicillin sulfoxides can be rearranged to a mixture of valuable products including desacetoxycephalosporins has stimulated the investigation of penicillin rearrangement by others. I have recently discovered that penicillin sulfoxides are converted to thiazoline azetidinones by treatment with triphenyl phosphine or a trialkyl phosphite. These thiazoline azetidinones are potential starting points for the preparation of a number of interesting compounds.

SUMMARY

I have now discovered that the β-lactam ring of the thiazoline azetidinone is ruptured to yield a thiazolecarbonylaminobutenyl compound by treatment with an inorganic base or an acid at a temperature within the range of 0° to 100° C. for a period of time in excess of about three hours. These substituted thiazoles are useful as antibiotics and antifungal agents or as anti-radiation chemicals.

DESCRIPTION OF THE PREFERRED EMBODIMENTS

The thiazoline azetidinone starting materials for my process are those having the formula

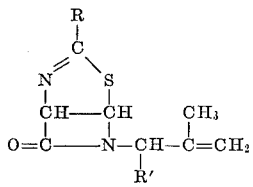

I wherein
R is $C_1$–$C_8$ alkyl, cycloalkyl, or alkenyl, optionally substituted with hydroxyl, $C_1$–$C_3$ alkoxy, or cyano,

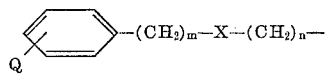

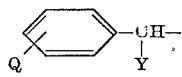

or

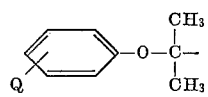

Q is hydrogen, hydroxyl, chloro, bromo, $C_1$–$C_3$ alkyl, $C_1$–$C_3$ alkoxy, nitro, or cyano;
X is oxygen, sulfur, or a carbon to carbon bond;

Y is hydroxy or protected amino;
m is an integer of 0–2;
n is an integer of 1–2;
R' is —$CH_2OZ$,

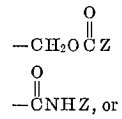

R'' is $C_1$–$C_4$ alkyl, $C_4$–$C_6$ t-alkyl, $C_5$–$C_8$ t-alkenyl, $C_5$–$C_8$ t-alkynyl, benzyl, methoxybenzyl, nitrobenzyl, benzhydryl, phthalimidomethyl, succinimidomethyl, phenacyl, trichloroethyl, or trimethylsilyl; and
Z is hydrogen; $C_1$–$C_8$ alkyl, cycloalkyl, or alkenyl, optionally substituted with hydroxyl, $C_1$–$C_3$ alkoxy, or cyano; or phenyl or phenyl-$C_1$–$C_3$ alkyl, optionally substituted with hydroxyl, chloro, bromo, $C_1$–$C_3$ alkyl, $C_1$–$C_3$ alkoxy, nitro, or cyano;
and the isomers thereof wherein the butenyl side-chain double bond is in the α,β-position rather than the β,γ-position.

By "protected amino" is meant an amino group substituted by an easily removable group such as triphenylmethyl, trimethylsilyl, t-butyloxycarbonyl, trichloroethoxycarbonyl, benzyloxycarbonyl, lower alkanoyl, benzoyl, or the enamine from methylacetoacetate. The protection of amino groups is well known to those skilled in the art. The particular protecting group used must be stable under the acidic or basic conditions employed, but otherwise is not important to this invention.

Specific examples of R include benzyl, phenoxymethyl, 2-phenoxyisopropyl, benzyloxymethyl, α-(N-benzyloxycarbonylamino)-benzyl, α-hydroxybenzyl, methyl, pentenyl, cyclohexyl, methoxyethyl, 2-cyanopropyl, heptyl, hydroxymethyl, cyclopentyl, m-chlorobenzyl, p-ethoxyphenoxymethyl p-nitrophenoxyethyl, o-methylbenzyl and p-hydroxyphenoxymethyl. The benzyl, phenoxymethyl, and 2-phenoxyisopropyl groups are preferred. Specific examples of R'' include methyl, ethyl, t-butyl, 3-methyl-3-butenyl, 3-methyl-3-butynyl, benzyl, p-methoxybenzyl, p-nitrobenzyl, phenacyl, and trichloroethyl. The preferred R'' groups are trichloroethyl and p-nitrobenzyl. The primary purpose of the R'' group is to protect the carboxyl group during the reaction. The protection of carboxyl groups by esterification and subsequent cleavage of the ester is well known to those skilled in the art. Examples of Z include methyl, t-butyl, pentenyl, phenyl, benzyl, methoxyethyl cyclohexyl, 2-cyanopropyl, hydroxymethyl, p-hydroxyphenyl, m-chlorobenzyl, o-methylphenylethyl, p-ethoxyphenyl, p-nitrobenzyl, and m-cyanophenyl.

Those skilled in the penicillin art will recognize that R, R', R'', and Z may have other values equivalent to those named.

The thiazoline azetidinone starting materials for the present process are obtained from penicillin sulfoxides having the following formula:

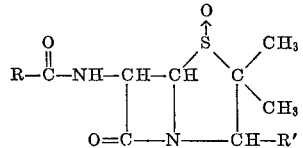

II wherein R and R' have the values listed above. This rearrangement of a penicillin sulfoxide to a thiazoline azetidinone is accomplished by treatment of the penicillin sulfoxide with triphenyl phosphine or a trialkyl phosphite such as trimethyl or triethyl phosphite at a temperature within the range of 0° to 50° C. This rearrangement of a penicillin will be illustrated by the following example.

Example 1

A mixture of 4.97 g. of the trichloroethyl ester of penicillin V sulfoxide and 1.86 g. of trimethyl phosphite in 120 ml. of ethyl acetate was heated under reflux for two days. The ethyl acetate was removed in vacuo and the residue was washed with cold Skellysolve B and recrystallized three times from 2B ethanol to yield 1 g. of product which was shown by infrared and nuclear magnetic resonance spectroscopy to have the following structure

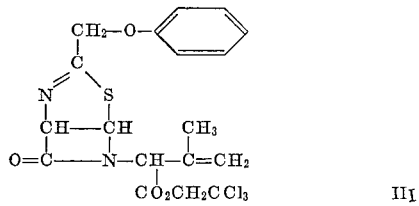

III

Analysis.—Calculated for $C_{18}H_{17}N_2O_4Cl_3S$ (percent): C, 46.61; H, 3.69; N, 6.04. Found (percent): C, 46.85; H, 3.64; N, 6.14.

The β-lactam ring of the thiazoline azetidinone starting material can be opened to yield the thiazoles of the present invention by treatment with either acid or base. When the ring opening is accomplished with base the β,γ-double bond in the butenyl side chain is shifted to the α,β-position. It is also possible to treat the thiazoline azetidinone with base under very mild conditions for a short period of time of up to about 30 minutes to cause a shift in the position of the double bond without opening the β-lactam ring. This isomerized thiazoline azetidinone may then be converted to the thiazole by treatment with acid or base to yield the corresponding α,β-isomer.

In either the acid or base cleavage the reaction is conducted at a temperature within the range of 0° to 100° C. for a period of time of at least three hours and preferably from 16 to 24 hours. The reaction is slow at room temperature and below so that long reaction times are necessary at these temperatures. At higher temperatures shorter reaction times may be used. The reaction is preferably carried out in an inert solvent such as benzene, tetrahydrofuran, or dimethylformamide. It is also possible to use acetic acid as solvent.

The base to be used in cleaving the β-lactam ring is an inorganic base that is a good nucleophile. Such a base is an alkali metal salt of a weak acid having a dissociation constant of less than $10^{-4}$, an alkali metal alkoxide wherein the alkoxy group contains from one to about four carbon atoms, an alkali metal hydroxide, or an alkaline earth metal hydroxide. Examples of acceptable bases include sodium acetate, potassium carbonate, sodium bicarbonate, sodium methoxide, lithium ethoxide, potassium butoxide, sodium hydroxide, potassium hydroxide, calcium hydroxide, and magnesium hydroxide.

The acid to be used in the ring opening is a non-oxidizing organic or inorganic acid having a dissociation constant greater than $10^{-5}$. Typical examples of such acids include hydrochloric acid, acetic acid, formic acid, trifluoroacetic acid, toluenesulfonic acid and chloroacetic acid.

Preferred reagents for cleaving the β-lactam ring are sodium acetate or trifluoroacetic acid.

The amount of acid or base should be at least one equivalent per mole of thiazoline azetidinone and is preferably an excess of 10 to 100 percent. A larger excess can be used such as, for example, when an acid is employed as the solvent, but such a large excess is unnecessary.

My process for the preparation of the novel thiazoles of my invention will be further illustrated by the following examples.

Example 2

A solution of 150 mg. of the product from Example 1 in 30 ml. of tetrahydrofuran containing 2 ml. of 1 N hydrochloric acid was stirred at room temperature for one-half hour. The mixture was neutralized by the addition of sodium bicarbonate solution and the neutralized mixture was extracted with chloroform. Thin-layer chromatography of the chloroform extract showed starting material and two other less polar compounds. Nuclear magnetic resonance spectroscopy showed the product to be a mixture including some thiazole having the following structure

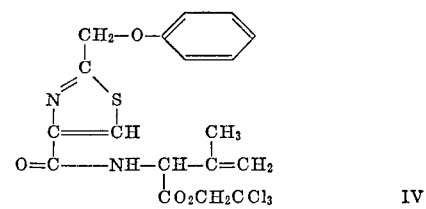

IV

A longer reaction time would probably have resulted in an increased yield of the thiazole.

Example 3

A solution of 463 mg. of the product form Example 1 in 30 ml. of formic acid was allowed to stand at room temperature for 24 hours. The solvent was removed in vacuo and the product was treated with ammonia. There was obtained a small amount of the thiazole having the following formula

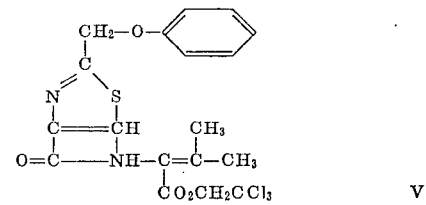

V

Example 4

A solution of 463 mg. of the product from Example 1 in 30 ml. of formic acid and 1 ml. of water was allowed to stand at room temperature for 24 hours. After evaporation of the solvent the nuclear magnetic resonance spectrum of the product showed no β-lactum present. The product appeared to be the thiazole of Formula IV.

Example 5

A solution of 463 mg. of the product form Example 1 and 500 mg. of trifluoroacetic acid in 50 ml. of tetrahydrofuran was allowed to stand at room temperature for three days. The solvent was removed in vacuo and the residue was crystallized from methanol yielding 170 mg. of starting material and 307 mg. of an oil. Nuclear magnetic resonance and mass spectroscopy showed the product to be the thiazole of Formula IV.

Example 6

A solution of 463 mg. of a thiazoline azetidinone having formula

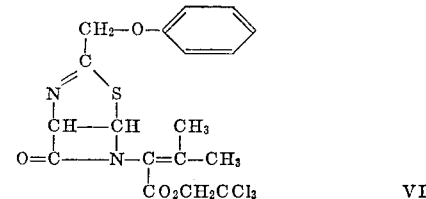

VI in 30 ml. of formic acid and 1 ml. of water was allowed to stand at room temperature for 24 hours. After evaporation of the solvent the nuclear magnetic resonance spectrum of the product showed it to contain no β-lactam and to be the thiazole of Formula V.

Example 7

About 1 g. of a methyl ester corresponding to the trichloroethyl ester of Formula VI was dissolved in 40 ml. of acetic acid and one gram of sodium acetate was added. This mixture was heated on a steam bath for three hours, then allowed to stand at room temperature for sixteen hours. The solvent was removed in vacuo. The nuclear magnetic resonance spectrum showed that some decomposition had occurred but the residue was mainly starting material and thiazole methyl ester corresponding to the trichloroethyl ester of Formula V.

Example 8

A solution of 650 mg. of the ester of Formula VI in 250 ml. of 1:1 aqueous acetic acid containing 1 g. of sodium acetate was stirred at room temperature overnight. The reaction mixture was poured in to 2000 ml. of water and extracted with ethyl acetate. The ethyl acetate solution was washed four times with 100 ml. portions of water, dried, and the ethyl acetate removed in vacuo to leave a colorless oil. Thin-layer chromatography and nuclear magnetic resonance spectroscopy showed the product to be the thiazole of Formula V containing very little starting material.

The novel thiazoles of my invention are those corresponding to either of the two formulas shown below.

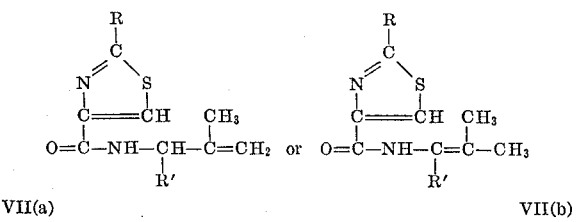

VII(a)       VII(b)

wherein R and R' have the values assigned above. A thiazole of Formula VII(a) is obtained when a thiazoline azetidinone of Formula I is treated with an acid as described herein. A thiazole of Formula VII(b) can be obtained by the treatment of a thiazoline azetidinone of Formula I with a base as described herein or may be obtained by treating the α,β-unsaturated isomer of Formula I with either acid or base to cleave the β-lactam ring.

The thiazole esters prepared as described above and the corresponding acids are useful as antibiotics. For example, the methyl ester prepared as described in Example 7 is active against the fungus *Botrytis cinerea* at a concentration of 100 mcg./ml. as determined by an agar dilution test method described by Steers and Foltz in Antibiotics and Chemotherapy 9, p. 307(1959). The corresponding acid is active as an antibiotic against the organism *Pseudomonas solanacearum*, strain X815, at a concentration of 100 mcg./ml. as determined by the agar dilution test. These compounds can be compounded into ointment and lotion compositions by known methods and applied to surface cuts and abrasions to prevent infections by Pseudomonas type organisms. The thiazoles of this invention can also be used as anti-radiation chemicals generally as set forth in Radiation Research 1, pp. 13-21 (1957).

I claim:

1. A thiazole having the formula

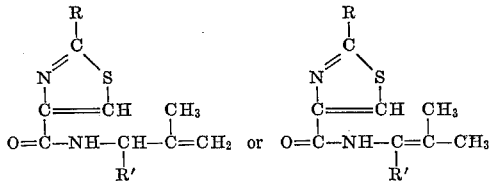

wherein

R is $C_1$–$C_8$ alkyl, cycloalkyl, or alkenyl, optionally substituted with hydroxyl, $C_1$–$C_3$ alkoxy, or cyano,

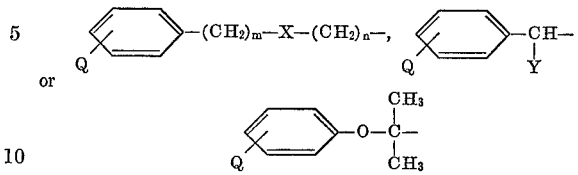

Q is hydrogen, hydroxyl, chloro, bromo, $C_1$–$C_3$ alkyl, $C_1$–$C_3$ alkoxy, nitro, or cyano;
X is oxygen, sulfur, or a carbon to carbon bond;
Y is hydroxy or protected amino;
$m$ is an integer of 0–2;
$n$ is an integer of 1–2;
R' is —$CH_2OZ$,

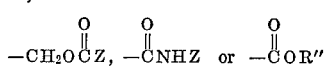

R'' is $C_1$–$C_4$ alkyl, $C_4$–$C_6$ t-alkyl, $C_5$–$C_8$ t-alkenyl, $C_5$–$C_8$ t-alkynyl, benzyl, methoxybenzyl, nitrobenzyl, benzhydryl, phthalimidomethyl, succinimidomethyl, phenacyl, trichloroethyl, or trimethylsilyl; and Z is hydrogen; $C_1$–$C_8$ alkyl, cycloalkyl, or alkenyl, optionally substituted with hydroxyl, $C_1$–$C_3$ alkoxy, or cyano; or phenyl or phenyl-$C_1$–$C_3$ alkyl, optionally substituted with hydroxyl, chloro, bromo, $C_1$–$C_3$ alkyl, $C_1$–$C_3$ alkoxy, nitro, or cyano.

2. A method for the preparation of a thiazole having the formula

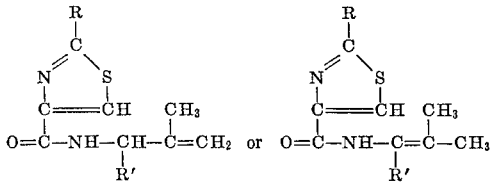

which comprises treating a thiazoline azetidinone having the formula

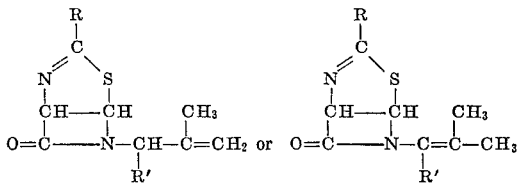

with at least one equivalent of an alkali metal salt of an acid having a dissociation constant of less than $10^{-4}$, an alkali metal alkoxide wherein the alkoxy group contains from one to four carbon atoms, an alkali metal hydroxide, an alkaline earth metal hydroxide, or a non-oxidizing acid having a dissociation constant greater than $10^{-5}$ at a temperature within the range of 0° to 100° C. for a time of at least three hours;

wherein

R is $C_1$–$C_8$ alkyl, cycloalkyl, or alkenyl optionally substituted with hydroxyl, $C_1$–$C_3$ alkoxy, or cyano,

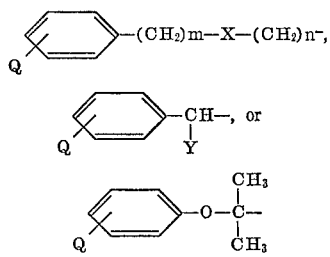

Q is hydrogen, hydroxyl, chloro, bromo, $C_1$–$C_3$ alkyl, $C_1$–$C_3$ alkoxy, nitro, or cyano;

X is oxygen, sulfur, or a carbon to carbon bond;
Y is hydroxy or protected amino;
$m$ is an integer of 0–2;
$n$ is an integer of 1–2;
R' is —CH$_2$OZ, $$-\text{CH}_2\text{O}\overset{\text{O}}{\underset{\|}{\text{C}}}\text{Z}$$

or $$-\overset{\text{O}}{\underset{\|}{\text{C}}}\text{NHZ}$$

$$-\overset{\text{O}}{\underset{\|}{\text{C}}}\text{OR}''$$

R'' is C$_1$–C$_4$ alkyl, C$_4$–C$_6$ t-alkyl, C$_5$–C$_8$ t-alkenyl, C$_5$–C$_8$ t-alkynyl, benzyl, methoxybenzyl, nitrobenzyl, benzhydryl, phthalimidomethyl, succinimidomethyl, phenacyl, trichloroethyl, or trimethylsilyl; and Z is hydrogen; C$_1$–C$_8$ alkyl, cycloalkyl, or alkenyl, optionally substituted with hydroxyl, C$_1$–C$_3$ alkoxy, or cyano; or phenyl or phenyl-C$_1$–C$_3$ alkyl, optionally substituted with hydroxyl, chloro, bromo, C$_1$–C$_3$ alkyl, C$_1$–C$_3$ alkoxy, nitro, or cyano.

3. A method as in claim 2 wherein the thiazoline azetidinone is treated with sodium acetate.

4. A method as in claim 2 wherein the thiazoline azetidinone is treated with trifluoroacetic acid.

References Cited
UNITED STATES PATENTS

| | | | |
|---|---|---|---|
| 3,275,626 | 9/1966 | Morin et al. | 260—239.1 |
| 3,304,305 | 2/1967 | Kiss et al. | 260—302R |

ALEX MAZEL, Primary Examiner

R. J. GALLAGHER, Assistant Examiner

U.S. Cl. X.R.

260—239.1, 306.7; 424—270